(12) United States Patent
Darney et al.

(10) Patent No.: US 11,396,384 B2
(45) Date of Patent: Jul. 26, 2022

(54) CRADLE ASSEMBLY FOR SUPPORTING A DOOR FOR UNINSTALLING OR INSTALLING TO AN AIRCRAFT, AND ARRANGEMENTS AND METHODS FOR THE SAME

(71) Applicant: Gulfstream Aerospace Corporation, Savannah, GA (US)

(72) Inventors: Coleda Darney, Savannah, GA (US); Patrick Leonard, Savannah, GA (US); James E. Perdue, Savannah, GA (US); Jeffrey Slump, Savannah, GA (US); Collin Rogers, Savannah, GA (US); Richard Kitchen, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/949,578

(22) Filed: Nov. 4, 2020

(65) Prior Publication Data

US 2021/0130011 A1 May 6, 2021

Related U.S. Application Data

(63) Continuation-in-part of application No. 15/988,742, filed on May 24, 2018, now Pat. No. 10,850,867.

(51) Int. Cl.
*B64F 5/50* (2017.01)
*B66F 3/22* (2006.01)
*B64C 1/14* (2006.01)

(52) U.S. Cl.
CPC .............. *B64F 5/50* (2017.01); *B64C 1/1407* (2013.01); *B66F 3/22* (2013.01)

(58) Field of Classification Search
CPC ...... B64F 5/10; B64F 5/40; B64F 5/50; B66F 9/06; B66F 3/22; B66F 5/00; B66F 5/02;
(Continued)

(56) References Cited

U.S. PATENT DOCUMENTS 2,712,874 A * 7/1955 Murray ..................... B60P 3/11
414/743
2,851,235 A * 9/1958 Henig ....................... F41A 9/87
410/44

(Continued)

*Primary Examiner* — Lee D Wilson
*Assistant Examiner* — Alberto Saenz
(74) *Attorney, Agent, or Firm* — LKGlobal | Lorenz & Kopf, LLP

(57) ABSTRACT

Cradle assemblies for supporting a door for uninstalling and/or installing the door to a fuselage of an aircraft, and arrangements and methods for the same are provided. In one example, a cradle assembly includes a first contoured board and a second contoured board that is spaced apart from the first contoured board. The first and second contoured boards are cooperatively configured to support outer sections of a first door. A third contoured board is configured to be selectively positioned adjacent to and extending higher than the first contoured board to support a first outer section of a second door that has a different outer shape than the first door. The third contoured board is contoured to substantially match the first outer section of the second door. The cradle assembly is configured to be positioned proximate to the fuselage.

10 Claims, 8 Drawing Sheets

(58) Field of Classification Search
CPC .. B66F 7/06; B66F 7/0625; B66F 7/26; B25B 11/00; B25B 11/02; B23Q 3/062; B23Q 3/18; B23Q 3/186; B23Q 7/005; Y10T 29/53983; B64C 1/1407
USPC ........................................................ 29/281.6
See application file for complete search history.

(56) References Cited

U.S. PATENT DOCUMENTS

| | | | |
|---|---|---|---|
| 3,071,269 A * | 1/1963 | Moulds, Jr. ............ | B65D 19/44 414/608 |
| 10,377,288 B2 | 8/2019 | Davis | |
| 2007/0007390 A1 | 1/2007 | Doerer | |

* cited by examiner

CRADLE ASSEMBLY FOR SUPPORTING A DOOR FOR UNINSTALLING OR INSTALLING TO AN AIRCRAFT, AND ARRANGEMENTS AND METHODS FOR THE SAME

CROSS-REFERENCE TO RELATED APPLICATIONS

This application is a continuation-in-part (CIP) application of U.S. application Ser. No. 15/988,742, which was filed on May 24, 2018, the entire contents of which are herein incorporated by reference.

TECHNICAL FIELD

The technical field relates generally to installing and/or removing doors of aircrafts, and more particularly, relates to cradle assemblies for supporting a door for uninstalling and/or installing the door to a fuselage of an aircraft, and arrangements and methods for the same.

BACKGROUND

In the aircraft industry, many structural components require service maintenance during the life of an aircraft. Aircraft doors are no different. For example, a passenger aircraft door is a relatively complicated assembly that includes various components such as an outer skin supported by an underlying structure, various hydraulics and electrical components that are embedded within the door's structure, and stairs on an opposite side of the outer skin for passenger ingress and egress. Additionally, the aircraft door may include various seals, hinges, latches, releases, handles and other like components.

Typically, one or more components of an aircraft door will require servicing at various times during the life of the aircraft. This may require uninstalling or removing the door from the aircraft's fuselage, partially or fully disassembling portions of the door such as the stairs to gain access to various underlying components, for example, hydraulics, electrical components, and/or the like, performing the necessary service maintenance, reassembling the door, and installing the door back to the aircraft's fuselage.

Often, such aircraft door service maintenance is performed at aircraft service centers where the aircraft is either on the ground or on relatively low standing jacks rather than at an aircraft production facility where the aircraft is often assembled relatively high above the ground, for example, on relatively high standing jacks or the like. Unfortunately, production tooling used for supporting an aircraft door during installation of the door to the aircraft's fuselage either won't work when the aircraft is on the ground or on relatively low standing jacks and/or is not practically available at most aircraft service centers. As such, many aircraft service centers struggle with a practical means for supporting a door for uninstalling and/or reinstalling the door to the fuselage, for example, as part of performing service maintenance on the door.

Accordingly, it is desirable to provide an apparatus for supporting a door for uninstalling and/or installing the door to a fuselage of an aircraft, for example, to facilitate servicing the door, and a method for the same. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a cradle assembly for supporting a door to a fuselage of an aircraft, and a cradle assembly and lift arrangement and a method for the same are provided herein.

In a first non-limiting embodiment, the cradle assembly includes, but is not limited to, a first contoured board and a second contoured board that is spaced apart from the first contoured board. The first and second contoured boards are cooperatively configured to support outer sections of a first door. The cradle assembly further includes, but is not limited to, a third contoured board that is configured to be selectively positioned adjacent to and extending higher than the first contoured board to support a first outer section of a second door that has a different outer shape than the first door. The third contoured board is contoured to substantially match the first outer section of the second door. The cradle assembly is configured to be positioned proximate to the fuselage.

In another non-limiting embodiment, the cradle assembly and lift arrangement includes, but is not limited to, a lift that includes a table and that is configured to vertically move the table. The cradle assembly and lift arrangement further includes, but is not limited to, a cradle assembly that is mounted on the table of the lift. The cradle assembly includes, but is not limited to, a first contoured board and a second contoured board that is spaced apart from the first contoured board. The first and second contoured boards are cooperatively configured to support outer sections of a first door. The cradle assembly further includes, but it's not limited to, a third contoured board that is configured to be selectively positioned adjacent to and extending higher than the first contoured board to support a first outer section of a second door that has a different outer shape than the first door. The third contoured board is contoured to substantially match the first outer section of the second door. The cradle assembly is configured to be positioned proximate to the fuselage.

In another non-limiting embodiment, the method includes, but it's not limited to, supporting a cradle assembly on a table of a lift. The cradle assembly includes, but is not limited to, a first contoured board and a second contoured board that is spaced apart from the first contoured board. The first and second contoured boards are cooperatively configured to support outer sections of a first door. The cradle assembly further includes, but is not limited to, a third contoured board that is configured to be selectively positioned adjacent to and extending higher than the first contoured board to support a first outer section of a second door that has a different outer shape than the first door. The third contoured board is contoured to substantially match the first outer section of the second door. The method further includes, but is not limited to, moving the table of the lift to advance the cradle assembly to a first position that is proximate to the fuselage. The method further includes, but is not limited to, supporting the first outer section of the second door with the third contoured board positioned adjacent to and extending higher than the first contoured board. The method further includes, but is not limited to, one of uninstalling and installing the door to the fuselage while the second door is supported by the cradle assembly in the first position.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to cradle assemblies for supporting a door for uninstalling or installing the door to a fuselage of an aircraft, and arrangements and methods for the same. The exemplary embodiments taught herein provide a cradle assembly for supporting a door of an aircraft. The cradle assembly may form part of an arrangement with a lift that includes a table configured to be moved vertically. In an exemplary embodiment, the cradle assembly includes a base that is mounted on the table of the lift so that the cradle assembly can be moved together with the table by the lift.

The cradle assembly includes a first contoured board and a second contoured board that are spaced apart from each other and that extend generally upward from the base. In an exemplary embodiment, the table of the lift is moved to advance the first and second contoured boards to a first position that is proximate to the fuselage (e.g., adjacent to a door opening formed through the wall of the fuselage). First and second outer sections of the door are supported by the first and second contoured boards, respectively. In one example, the first and second contoured boards have first and second contoured edges, respectively, that are disposed distally from the base and that are contoured to form a cradle for receiving and supporting the door in a generally horizontal position. While supported by the cradle assembly in the first position, the door is sufficiently stable to allow the door to be unattached from (e.g., uninstalled), or alternatively, attached (e.g., installed) to the aircraft's fuselage.

Figure 1:
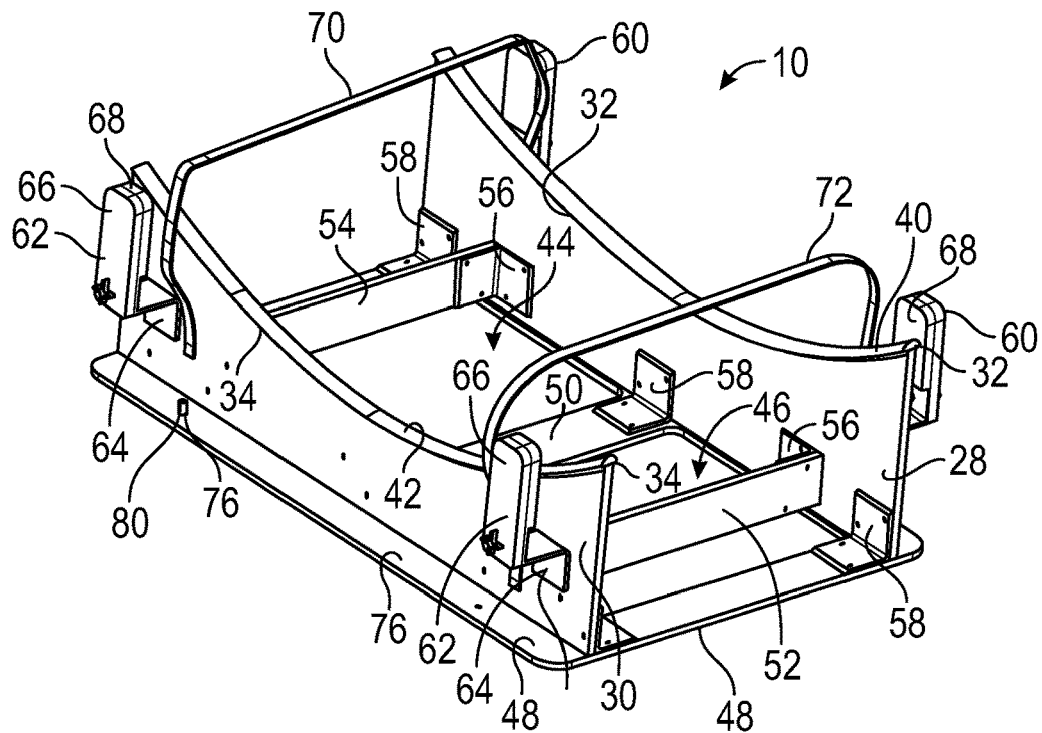
FIG. 1 illustrates a perspective view of a cradle assembly in accordance with an exemplary embodiment.
Figure 2:
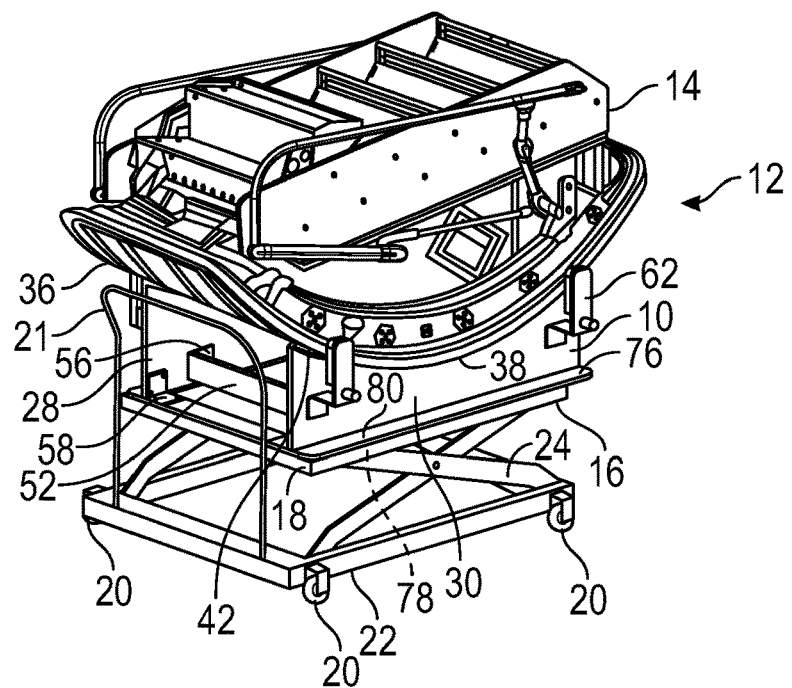
FIG. 2 illustrates a perspective view of a cradle assembly and lift arrangement including a door that is supported in the cradle arrangement in accordance with an exemplary embodiment.
Figure 3:
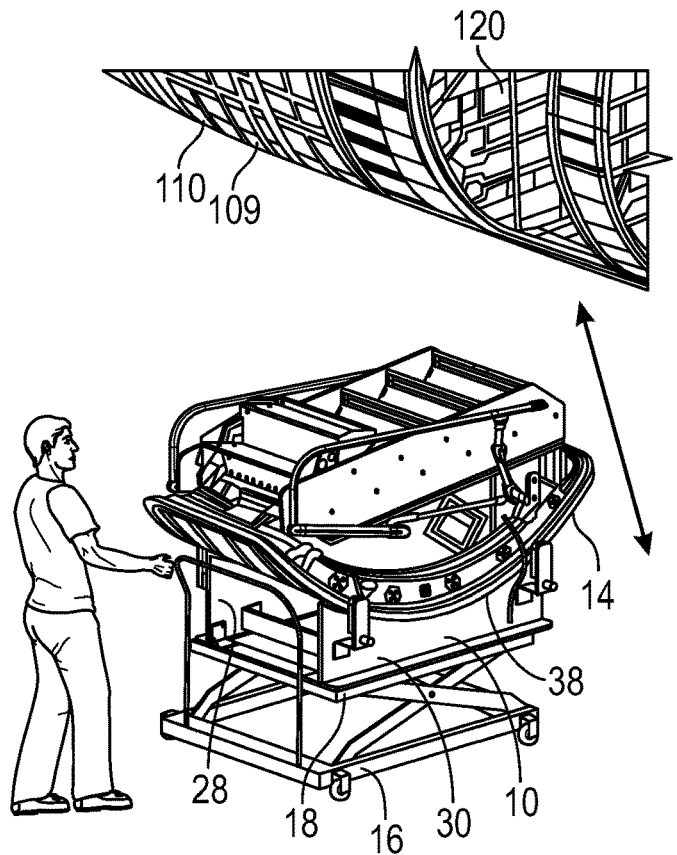
FIG. 3 illustrates a perspective view of a fuselage of an aircraft and a cradle assembly and lift arrangement including a door that is supported in the cradle arrangement in accordance with an exemplary embodiment.
Figure 4:
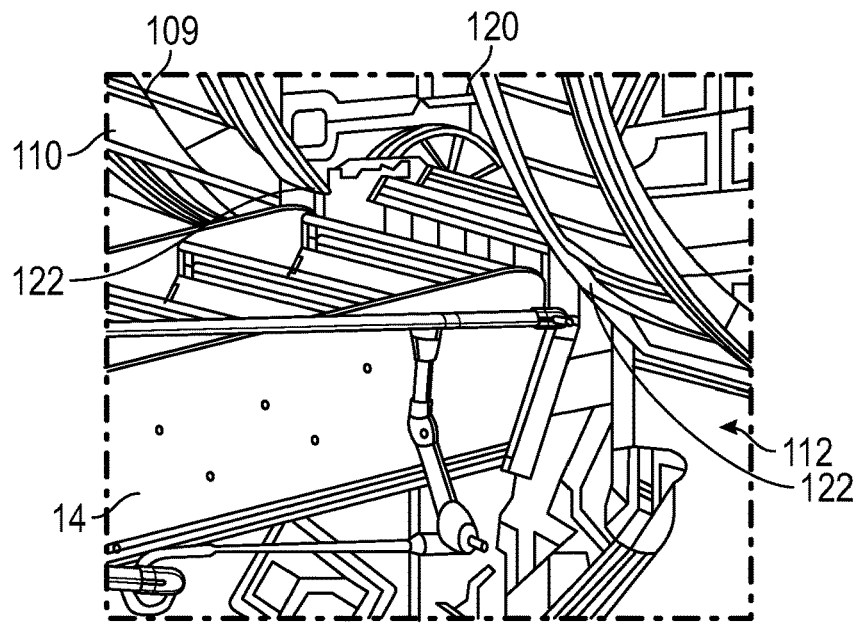
FIG. 4 is an enlarged view of a door being uninstalled or installed to a fuselage of an aircraft in accordance with an exemplary embodiment.
Figure 5:
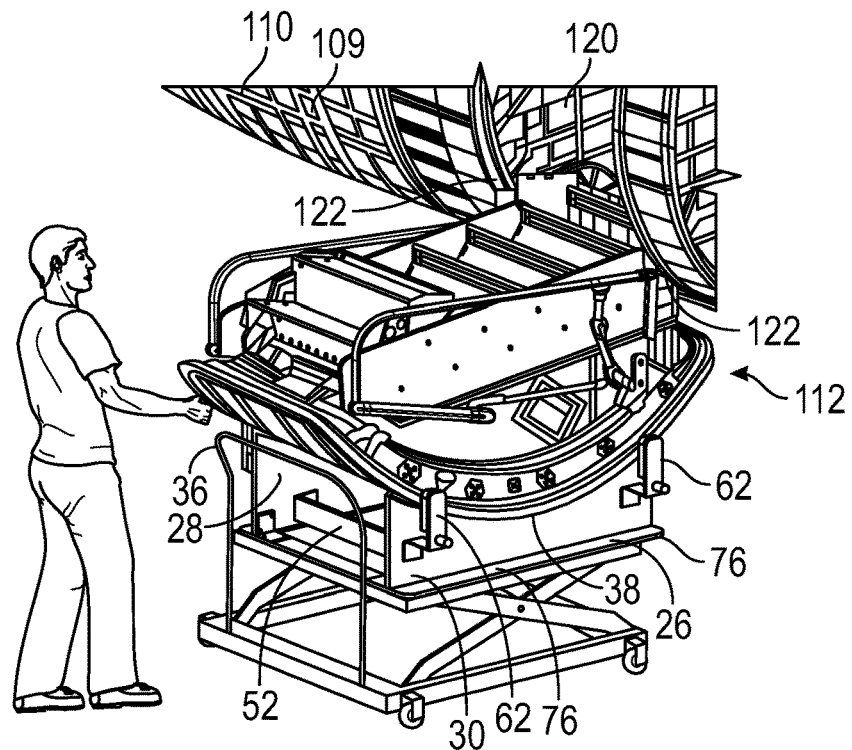
FIG. 5 illustrates a perspective view of a fuselage of an aircraft and a cradle assembly and lift arrangement supporting a door that is being uninstalled or installed to the fuselage in accordance with an exemplary embodiment.

FIG. 1 illustrates a perspective view of a cradle assembly 10 in accordance with an exemplary embodiment. FIG. 2 illustrates a perspective view of a cradle assembly and lift arrangement 12 including a door 14 of an aircraft in accordance with an exemplary embodiment. The cradle assembly and lift arrangement 12 includes the cradle assembly 10 for supporting the door 14, and a lift 16 that supports the cradle assembly 10.

The lift 16 includes a table 18 and is configured to move the table 18 vertically upward and/or downward. The lift 16 may also include wheels 20 that are attached to a base frame 22 of the lift 16 to allow the lift 16 to be moved along the floor, platform, or other relatively horizontal or sloped surface by applying manual force, for example, to a handle 21 that is coupled to the base frame 22. As illustrated, the lift 16 is a scissor lift that includes linked, folding supports 24 in a crisscross "X" pattern (known as a pantograph or scissors mechanism) that extends between and are coupled to the base frame 22 and the table 18 to move the table 18 in a generally vertical direction(s) (e.g., upward and/or downward). For example, the upward motion of the table 18 may be achieved by application of pressure to elongate the crisscross pattern, thereby propelling the table 18 upward. The application of pressure can be hydraulic, pneumatic, or mechanical. Depending on the power system employed on the lift 16, it may require no power to lower the table, but rather just the force of gravity and a simple release of hydraulic or pneumatic pressure. Other types of lifts known to those skilled in the art may be used as part of the cradle assembly and lift arrangement 12 instead of a scissor lift.

The cradle assembly 10 is supported on the table 18 of the lift 16. As will be discussed in further detail below, the cradle assembly 10 includes a base 26 that is mounted on the table 18 of the lift 16.

The cradle assembly 10 has contoured boards 28 and 30 that extend generally upward from the base 26 and that spaced apart from each other. The contoured boards 28 and 30 have contoured edges 32 and 34 that are disposed distally from the base 26 and that are configured to support outer sections 36 and 38 of the door 14. In the illustrated example, the contoured edges 32 and 34 substantially match the curved or convex shape of the outer sections 36 and 38 of the door 14 to define a "concave-shaped" cradle support structure for receiving and supporting the outer sections 36 and 38 of the door 14 while the door 14 is in a generally horizontal position. In an exemplary embodiment, the base 26 and the contoured boards 28 and 30 are formed of a rigid structural material, such as metal, plastic, or the like, for example, a plastic material such as high density polyethylene (HDPE).

Flexible guards 40 and 42 are correspondingly disposed along the contoured edges 32 and 34. In an exemplary embodiment, the flexible guards 40 and 42 directly interface with the outer sections 36 and 38 of the door 14 and advantageously are compliant to help prevent scratching, marring, or other damage to the outer surface of the door 14 when supported in the cradle assembly 10. The flexible guards 40 and 42 may be formed of a compliant, flexible, and/or elastomeric material, such as rubber, foam, or the like.

As illustrated, the base 26 has openings 44 and 46 formed therethrough that are surrounded by an outer perimeter base section 48 of the base 26. An intermediate base section 50 extends between opposite sides of the outer perimeter base section 48, separating the openings 44 and 46. The contoured boards 28 and 30 extend generally upward from the opposite sides of the outer perimeter base section 48 and outboard of the intermediate base section 50. In an exemplary embodiment, advantageously the openings 44 and 46 help reduce the overall weight of the cradle assembly 10 while the intermediate base section 50 helps structurally support the outer perimeter base section 48.

In an exemplary embodiment, the cradle assembly 10 includes supports 52 and 54 (e.g., support beams) that extend between and are coupled to the contoured boards 28 and 30. The supports 52 and 54 are formed of a relatively rigid, structural material such as metal, plastic, or the like, for example HDPE. As illustrated, brackets 56 couple the supports 52 and 54 to the contoured boards 28 and 30. Likewise, brackets 58 couple the base 26 to the contoured boards 28 and 30. In an exemplary embodiment, advantageously the supports 52 and 54 coupled to the contoured boards 28 and 30, and the contoured boards 28 and 30 coupled to the base 26 with the brackets 56 and 58, respectively, form a rigid frame structure of the cradle assembly 10 for securely supporting the door 14 in a desired orientation or position.

In an exemplary embodiment, the cradle assembly 10 includes arms 60 and 62 that are disposed outboard of and coupled to the contoured boards 28 and 30, respectively. The arms 60 and 62 cooperate to limit lateral movement of the door 14 when supported in the cradle assembly 10. As illustrated, the arms 60 and 62 are configured as "Z-shaped" brackets having a first end section 64 that is coupled to the corresponding contoured boards 28 and 30, and a second end section 66 that extends upward beyond and laterally adjacent to the corresponding contoured edges 32 and 34 to prevent the door 14 from shifting laterally (e.g., sideways) in the cradle assembly 10. A layer of foam 68 is disposed along the inboard side of the second end section 66 of each of the arms 60 and 62. Advantageously, the layer of foam 68 helps prevent scratching, marring or other damage to the surface and/or edges of the door 14.

Figure 6:
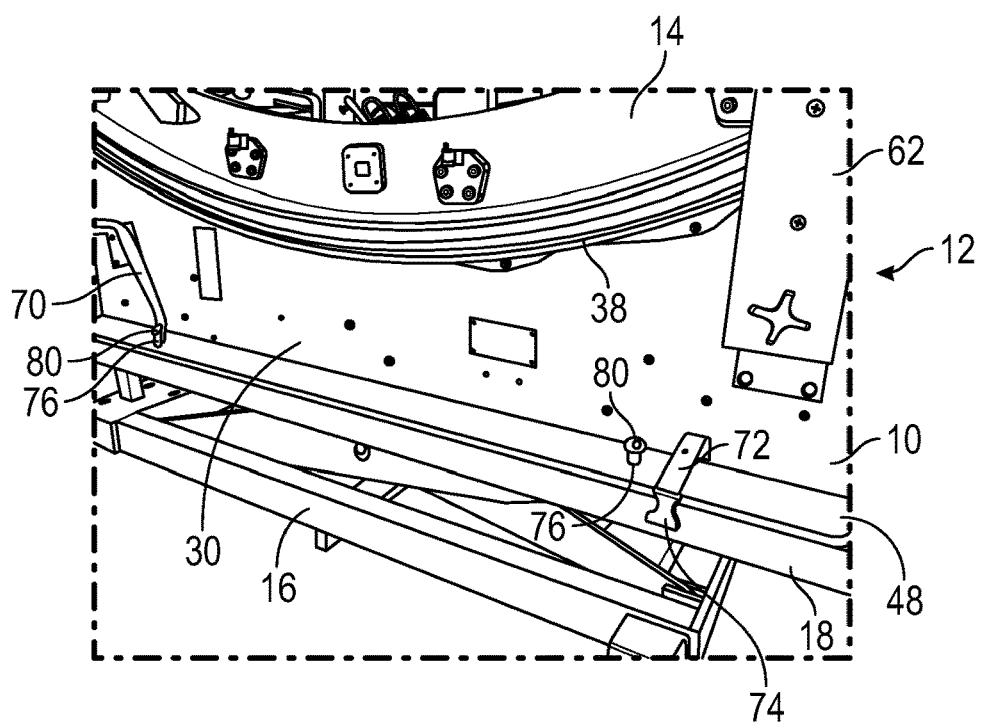
FIG. 6 is in a large perspective view of a portion of a cradle assembly and lift arrangement including a door supported in the cradle assembly in accordance with an exemplary embodiment.
Figure 7:
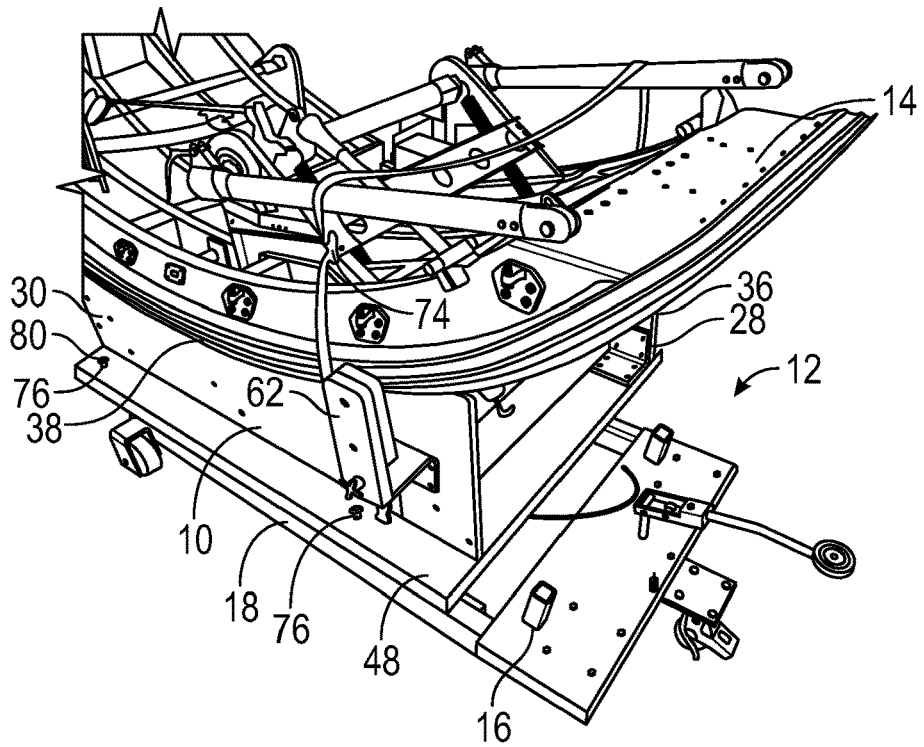
FIG. 7 is a perspective view of a cradle assembly and lift arrangement including a door supported in the cradle assembly in accordance with an exemplary embodiment.
Figure 8:
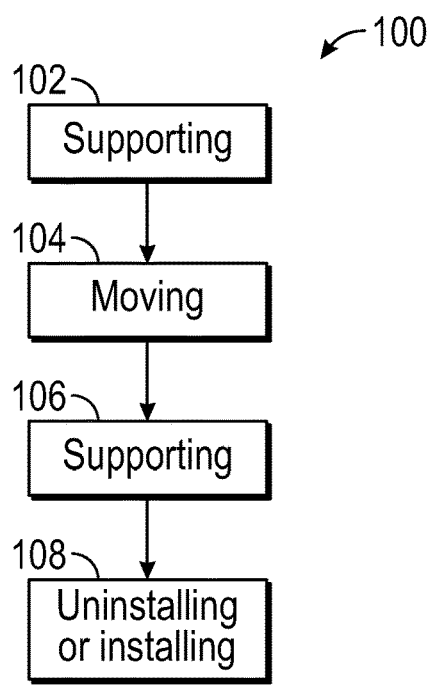
FIG. 8 illustrates a method for supporting a door for uninstalling or installing the door to a fuselage of an aircraft in accordance with an exemplary embodiment.

Adjacent to the arms 60 and 62 are straps 70 and 72 that extend between the contoured boards 28 and 30. The straps 70 and 72 each have an end coupled to the contoured board 28 and an opposing end coupled to the contoured board 30. Referring also to FIGS. 6-7, in an exemplary embodiment, the straps 70 and 72 also include a snap fit attachment 74 that allows the straps 70 and 72 to be wrapped around the door 14 and secured to help limit movement of the door 14 when supported in the cradle assembly 10.

As discussed above, the base 26 is mounted to and attached to the table 18 of the lift 16. In an exemplary embodiment, base through-holes 76 are formed through the opposing sides of the outer perimeter base section 48 aligned with corresponding table through-holes 78 that are formed through the table 18. Releasable pin elements 80 (e.g., ball release pins or the like) are disposed through the base through-holes 76 and the table through-holes 78 to releasably attach the opposing sides of the outer perimeter base section 48 to the table 18.

Referring to FIGS. 3-5 and 8, a method 100 for supporting a door 14 for one of uninstalling and installing the door 14 to a fuselage 109 of an aircraft 110 is provide. The method 100 includes supporting (step 102) contoured boards 28 and 30 on a table 18 of a lift 16. The table 18 of the lift 16 is moved (STEP 104) to advance the contoured boards 28 and 30 to a position (indicated by single headed arrow 112) that is proximate to the fuselage 109. Outer sections 36 and 38 of the door 14 are supported (STEP 106) with the contoured boards 28 and 30. The door 14 is uninstalling or installing (STEP 108) to the fuselage 109 while the outer sections 36 and 38 of the door 14 are supported by the contoured boards 28 and 30 in the position 112. As illustrated, the door 14 is positioned in a generally horizontal position while being supported by the contoured boards 28 and 30.

In one example, the door 14 is pivotally coupled or otherwise attached to the fuselage 109 of the aircraft 110 and is in a partially open position so as to extend generally horizontally in a direction away from the fuselage door opening 120. The table 18 of the lift 16 is moved vertically upward to advance the contoured boards 28 and 30 to the position 112 to receive and support the outer sections 36 and 38 of the door 14 in the partially open position. While supported in the cradle assembly 10, the door 14 is uninstalled by unfastening the door attachments 122 to the fuselage 109. The table 18 of the lift 16 is then moved vertically downward to remove the door 14 from the aircraft 110, for example, for servicing the door 14.

In another example, after servicing the door 14, the unattached door 14 is supported in the cradle assembly 10 in a generally horizontally position. The table 18 of the lift 16 is moved vertically upward to advance the contoured boards 28 and 30 and the door 14 to the position 112 to support the door 14 in the generally horizontally position adjacent to the fuselage door opening 120. While supported in the cradle assembly 10, the door 14 is installed by fastening the door attachments 122 to pivotally couple or otherwise attach the door 14 to the fuselage 109 of the aircraft 110.

Figure 9:
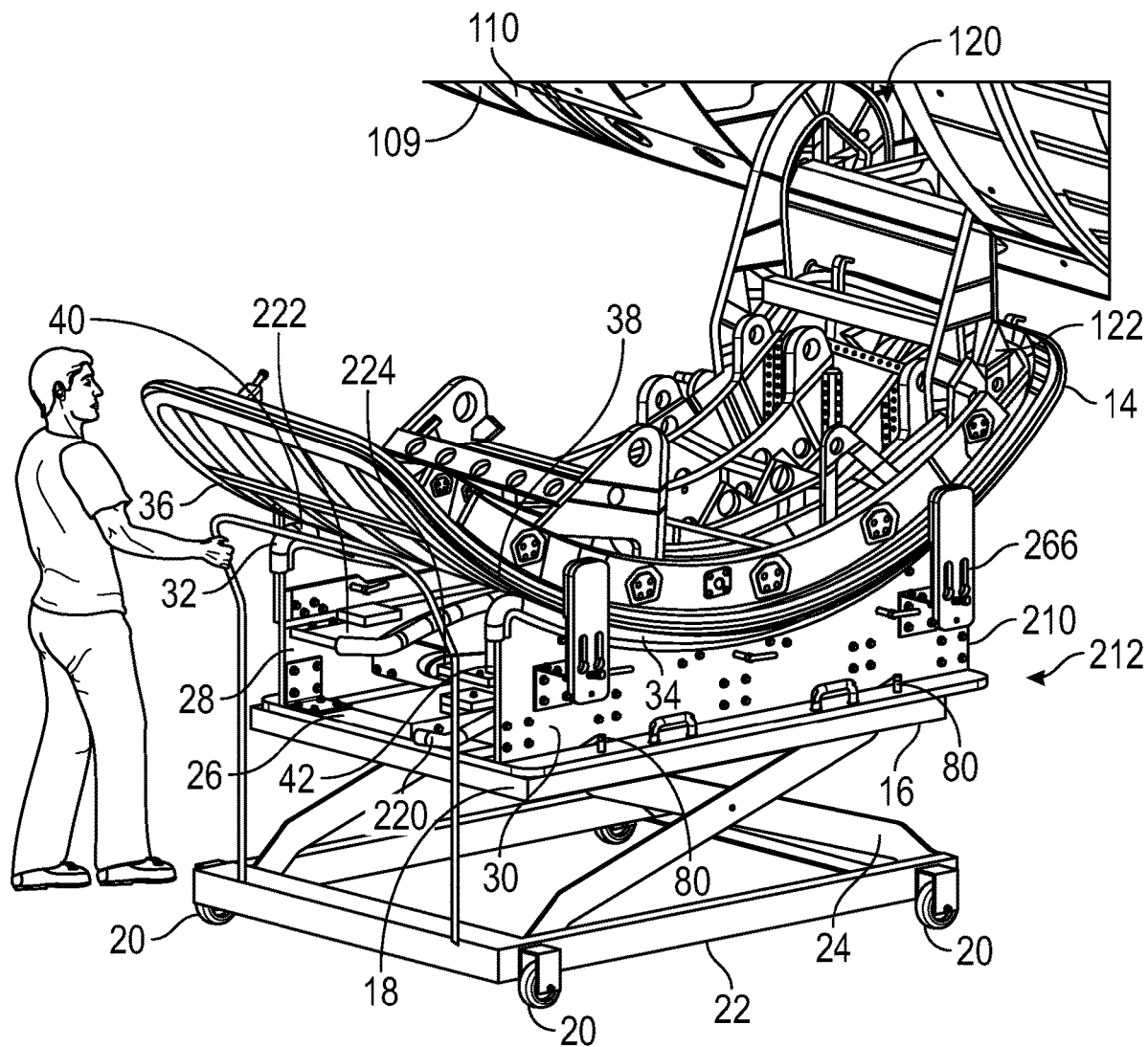
FIG. 9 illustrates a perspective view of a cradle assembly and lift arrangement including a door that is supported in the cradle assembly in accordance with an exemplary embodiment.
Figure 10:
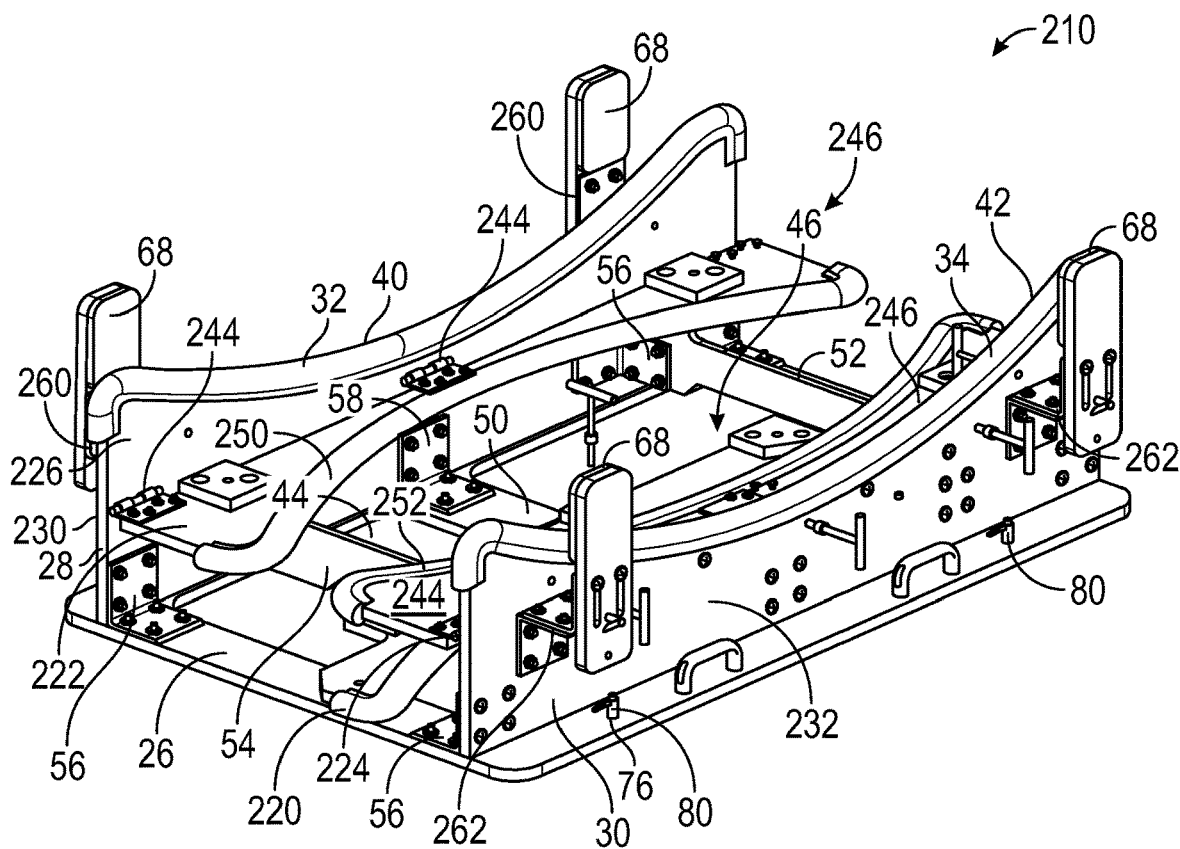
FIG. 10 illustrates a perspective view of a cradle assembly in accordance with an exemplary embodiment.

Referring to FIGS. 9-10, in accordance with an exemplary embodiment, a cradle assembly and lift arrangement 212 for supporting the door 14 to the fuselage 109 of the aircraft 110 is provided. The cradle assembly and lift arrangement 212 is similarly configured as the cradle assembly and lift arrangement 12 as discussed above in reference to FIGS. 1-7 including the lift 16 but with the exception that the cradle assembly 210 is configured to support not only the door 14 but other doors having a different outer shape(s) than the door 14. As such, in an exemplary embodiment, the cradle assembly 210 can be used for supporting various doors having different shapes, such as, for example, for different models of aircraft.

In particular, the cradle assembly 210 is similarly configured as the cradle assembly 10 as discussed above in reference to FIGS. 1-7 including the base 26, the contoured boards 28 and 30 with corresponding contoured edges 32 and 34, flexible guards 40 and 42, openings 44 and 46, supports 52 and 54, brackets 56 and 58, releasable pin elements 80 that couple to the table 18 of the lift 16, and foam pads 68, but with the exception that the arms are configured as adjustable arms 260 and 262, and additional contoured boards 220, 222, and 224 with flexible guards are provided that can be selectively position adjacent to the contoured boards 28 and 30 for supporting a door(s) having a different outer shape than the door 14.

Figure 11:
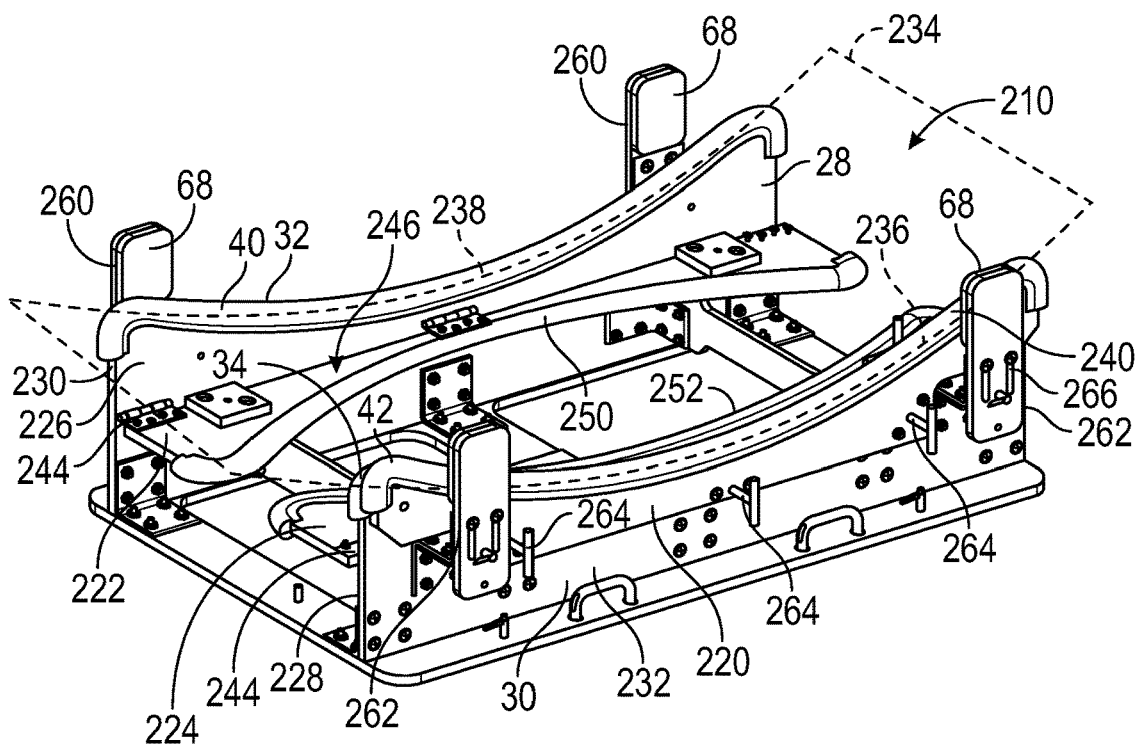
FIG. 11 illustrates a perspective view of a cradle assembly in accordance with an exemplary embodiment.

Referring to FIGS. 9-11, in an exemplary embodiment, the contoured board 220 when not in use is stored on or otherwise coupled to the base 26, for example space between the contoured boards 28 and 30. When the cradle assembly 210 is to be used to support a door having a somewhat similar but different shape than the door 14, for example having an outer section similar to the outer section 36 of the door 14 but with a different outer section than the outer section 38 of the door 14, the contoured board 220 is removed from the base 26 and is selectively positioned (e.g., deployed) adjacent to and extending higher than the contoured boards 30.

As illustrated, the contoured boards 28 and 30 each have a corresponding inboard side 226, 228 and a corresponding outboard side 230, 232 that is opposite the corresponding inboard side 226, 228. The inboard sides 226 and 228 of the contoured boards 28 and 30 are spaced apart and face each other. In an exemplary embodiment, the contoured board 220 is selectively coupled to the outboard side 232 of the contoured board 32 and is position adjacent to and extending higher than the contoured board 30. In one example, the contoured board 220 is attached to the contoured board 30 via removable pins 264 that extend through the contoured board 220 and engage internal bushings that are disposed in the contoured board 30.

In an exemplary embodiment, the contoured board 220 has a contoured edge 240 with a substantially concave shape that is configured for supporting an outer section 236 of a door 234. As illustrated, the outer section 238 of the door 234 is supported by the contoured edge 32 of the contoured board 28. In an exemplary embodiment, the contoured edge 240 and the contoured edge 32 substantially match the shapes of the corresponding outer sections 236 and 238 of the door 234.

Figure 12:
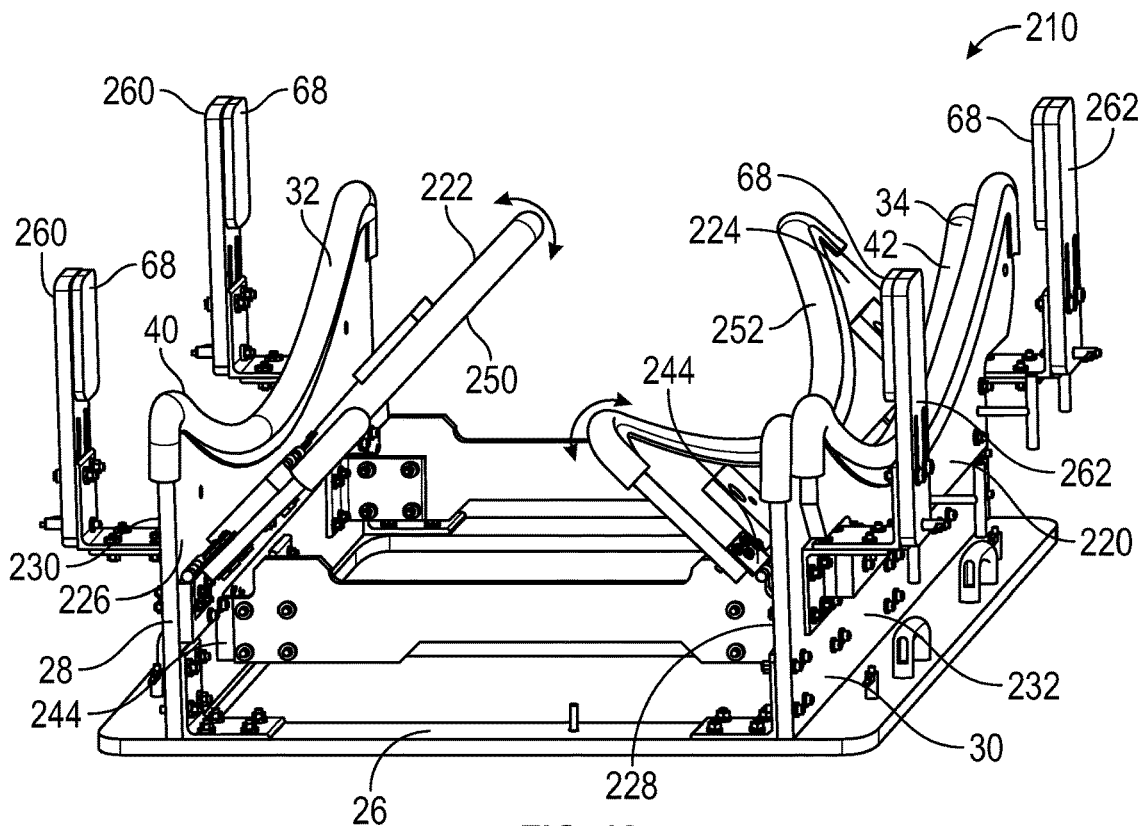
FIG. 12 illustrates a perspective view of a cradle assembly in accordance with an exemplary embodiment.
Figure 13:
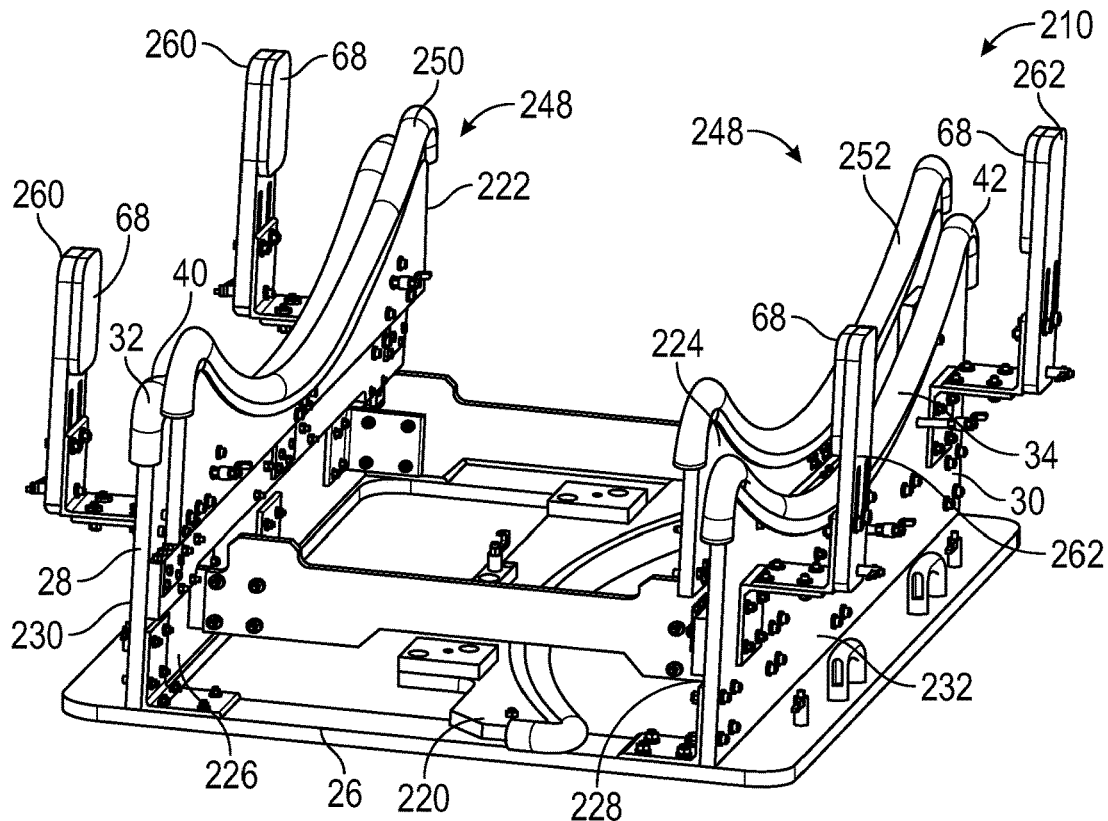
FIG. 13 illustrates a perspective view of a cradle assembly in accordance with an exemplary embodiment.
Figure 14:
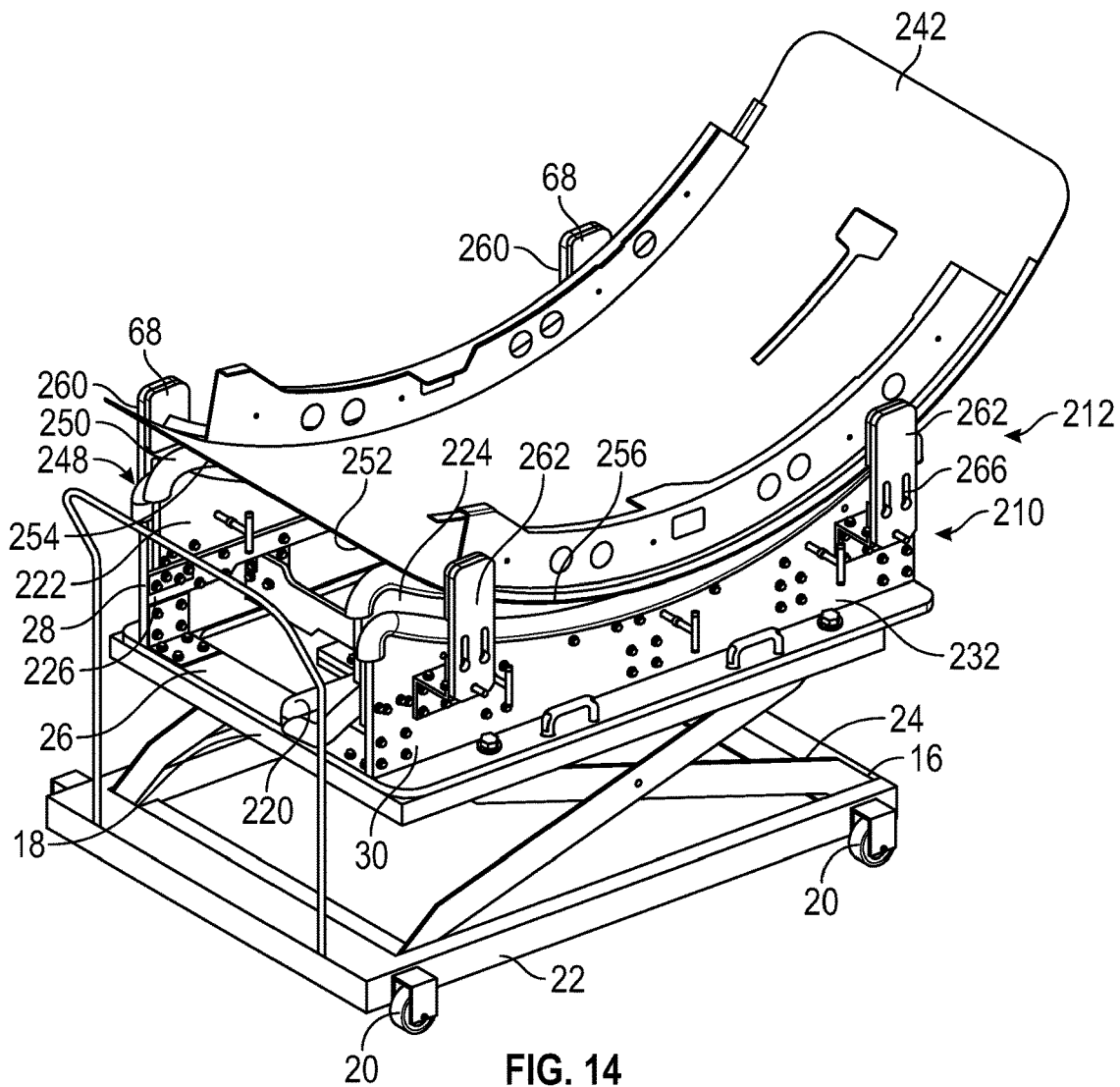
FIG. 14 illustrates a perspective view of a cradle assembly including a door supported in the cradle assembly in accordance with an exemplary embodiment.

Referring also to FIGS. 12-14, in an exemplary embodiment, the cradle assembly 210 is configured to support a door 242 that has a different outer shape than either of the doors 14 or 234. As illustrated, the contoured boards 222 and 224 are hingedly coupled to the contoured boards 20 and 30. As illustrated, the contoured boards 222 and 224 are correspondingly coupled to the inboard sides 226 and 228 via hinges 244, which are attached to the inboard sides 226 and 228 of the contoured boards 28 and 30 and, independently, to the corresponding contoured boards 222 and 224, to allow the contoured boards 222 and 224 to move between a retracted position 246 (shown in FIGS. 9-11) and an extended position 248 (shown in FIGS. 13-14). In the retracted position 246, the contoured boards 222 and 224 extend substantially horizontally and inwardly between the contoured boards 28 and 30 and below the contoured edges 32 and 34. From the retracted position 246, the contoured boards 222 and 224 can be manually moved (e.g., rotated upward) to selectively position the contoured boards 222 and 224 in the extended position 248 where the contoured boards 222 and 224 are disposed adjacent to and extend higher than the contoured edges 32 and 34 of the contoured boards 20 and 30, respectively. As illustrated, the contoured boards 222 and 224 have corresponding contoured edges 250 and 252 with substantially concave shapes that are configured for supporting outer sections 254 and 256, respectively, of the door 242. In an exemplary embodiment, the contoured edges 250 and 252 substantially match the shapes of the outer sections 254 and 256, respectively, of the door 242. As such, when the door 242 is arranged on the contoured boards 222 and 224 in the extended position 248, the door 242 is vertically spaced apart from (e.g., above) the contoured boards 20 and 30 to ensure that the door 242 is fully nested on the contoured edges 250 and 252 of the contoured boards 222 and 224.

As illustrated, the adjustable arms 260 and 262 are disposed outboard of and coupled to the corresponding outboard sides 230 and 232 of the contoured boards 28 and 30. In an exemplary embodiment, the adjustable arms 260 and 262 can be independently adjusted vertically in height so that the layers of foam 68, which are disposed on inboard sides of the arms 260 and 262, are positioned laterally adjacent to whichever door 14, 234 or 242 the cradle assembly 210 is supporting at the time. For example and as illustrated in FIGS. 9 and 11, the adjustable arms 260 and 262 include slots 266 that allow the layers of foam 68 to be moved manually to position the layers of foam 68 at a lower level laterally adjacent to the door 14 or 234, and to be move manually to position the layers of foam 68 at a higher level laterally adjacent to the door 242 as illustrated FIG. 14. Advantageously, in an exemplary embodiment, this helps limit lateral or side to side movement of the door 14, 234 or 244 when supported in the cradle assembly 210.

Figure 15:
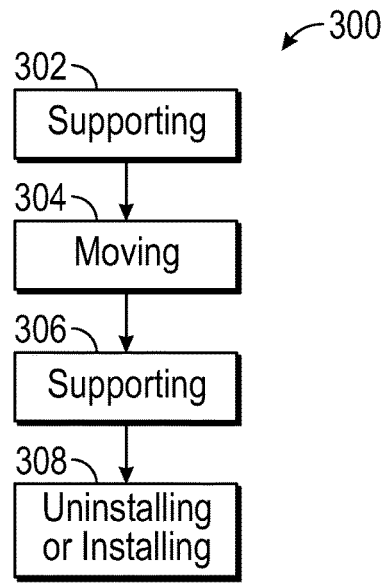
FIG. 15 illustrates a method for supporting a door for uninstalling or installing the door to a fuselage of an aircraft in accordance with an exemplary embodiment.

Referring to FIG. 15, a method 300 for supporting a door for one of uninstalling and installing the door to a fuselage of an aircraft is provide. The method 300 includes supporting (STEP 302) a cradle assembly on a table of a lift. The cradle assembly includes a first contoured board and a second contoured board that is spaced apart from the first contoured board. The first and second contoured boards are cooperatively configured to support outer sections of a first door. A third contoured board is configured to be selectively positioned adjacent to and extending higher than the first contoured board to support a first outer section of a second door that has a different outer shape than the first door. The third contoured board is contoured to substantially match the first outer section of the second door.

The table of the lift is moved (STEP 304) to advance the cradle assembly to a first position that is proximate to the fuselage. The first outer section of the second door is supported (STEP 306) with the third contoured board positioned adjacent to and extending higher than the first contoured board. The door is one of uninstalled and installed (STEP 308) to the fuselage while the second door is supported by the cradle assembly in the first position.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A cradle assembly for supporting a door to a body of a vehicle, the cradle assembly comprising:
a first contoured board;
a second contoured board spaced apart from the first contoured board, wherein the first and second contoured boards are cooperatively configured to support outer sections of a first door;
a base, wherein the first and second contoured boards extend generally upward from the base, wherein the first contoured board has a first inboard side and a first outboard side that is opposite the first inboard side, and wherein the second contoured board has a second inboard side that faces the first inboard side and a second outboard side that is opposite the second inboard side;
a third contoured board configured to be selectively positioned adjacent to and extending higher than the first contoured board to support a first outer section of a second door that has a different outer shape than the first door, wherein the third contoured board is contoured to substantially match the first outer section of the second door, and wherein the cradle assembly is configured to be positioned proximate to the body; and
a fourth contoured board configured to be selectively positioned adjacent to and extending higher than the second contoured board to support a second outer surface of the second door, wherein the fourth contoured board is contoured to substantially match the second outer section of the second door, wherein the third contoured board and the fourth contoured board are hingedly coupled to the first contoured board and the second contoured board, respectively.

2. The cradle assembly of claim 1, wherein the third contoured board has a first contoured edge that substantially matches a shape of the first outer section of the second door, and wherein the second contoured board has a second contoured edge that substantially matches a shape of corresponding outer sections of the first and second doors that are substantially similar to each other, and wherein other corresponding outer sections of the first and second doors have substantially different shapes than each other.

3. The cradle assembly of claim 2, wherein the first and second contoured edges each have a substantially concave shape for supporting the second door.

4. The cradle assembly of claim 1, wherein the third contoured board is hingedly coupled to the first inboard side of the first contoured board and the fourth contoured board is hingedly coupled to the second inboard side of the second contoured board.

5. The cradle assembly of claim 1, further comprising:
at least one first arm disposed outboard of and coupled to the first outboard side of the first contoured board; and
at least one second arm disposed outboard of and coupled to the second outboard side of the second contoured board, wherein the at least one first arm and the at least one second arm cooperate to limit lateral movement of the first door and the second door.

6. The cradle assembly of claim 5, further comprising:
at least one first layer of foam disposed along a third inboard side of the at least one first arm; and
at least one second layer of foam disposed along a fourth inboard side of the at least one second arm.

7. The cradle assembly of claim 5, wherein the at least one first arm and the at least one second arm are independently adjustable in height relative the first and second contoured boards.

8. A method for supporting a door to a body of a vehicle, the method comprising the steps of:
supporting the cradle assembly of claim 1 on a table of a lift;
moving the table of the lift to advance the cradle assembly to a first position that is proximate to the body;
supporting the door with the cradle assembly; and
one of uninstalling and installing the door to the body while the door is supported by the cradle assembly in the first position.

9. A cradle assembly and lift arrangement for supporting a door to a body of a vehicle, the cradle assembly and lift arrangement comprising:
a lift comprising a table and configured to vertically move the table; and
a cradle assembly mounted on the table of the lift, the cradle assembly comprising:
a first contoured board;
a second contoured board spaced apart from the first contoured board, wherein the first and second contoured boards are cooperatively configured to support outer sections of a first door;
a base that is mounted to the table of the lift, wherein the first and second contoured boards extend generally upward from the base, wherein the first contoured board has a first inboard side and a first outboard side that is opposite the first inboard side, and wherein the second contoured board has a second inboard side that faces the first inboard side and a second outboard side that is opposite the second inboard side;
a third contoured board configured to be selectively positioned adjacent to and extending higher than the first contoured board to support a first outer section of a second door that has a different outer shape than the first door, wherein the third contoured board is contoured to substantially match the first outer section of the second door, and wherein the cradle assembly is configured to be positioned proximate to the body, and
a fourth contoured board configured to be selectively positioned adjacent to and extending higher than the second contoured board to support a second outer surface of the second door, wherein the fourth contoured board is contoured to substantially match the second outer section of the second door, wherein the third contoured board and the fourth contoured board are hingedly coupled to the first contoured board and the second contoured board, respectively.

10. The cradle assembly and lift arrangement of claim 9, wherein the third contoured board is hingedly coupled to the first inboard side of the first contoured board and the fourth contoured board is hingedly coupled to the second inboard side of the second contoured board.

* * * * *